United States Patent [19]

Gurwicz

[11] 4,196,469

[45] Apr. 1, 1980

[54] DC-AC CONVERTER INCLUDING SYNCHRONIZED SWITCHING

[75] Inventor: David Gurwicz, Gateshead, England

[73] Assignee: Chloride Group Limited, London, England

[21] Appl. No.: 918,023

[22] Filed: Jun. 22, 1978

[30] Foreign Application Priority Data

Jun. 24, 1977 [GB] United Kingdom ............... 26680/77

[51] Int. Cl.² ........................................... H02M 7/537
[52] U.S. Cl. ..................................... 363/131; 363/37; 363/97
[58] Field of Search ............... 331/108 R, 114, 117 R, 331/117 D; 363/20, 21, 24, 25, 131–134, 97

[56] References Cited

U.S. PATENT DOCUMENTS

| | | | |
|---|---|---|---|
| 3,922,582 | 11/1975 | Pitel | 331/117 R X |
| 3,964,062 | 6/1976 | Flagg et al. | 331/117 R X |

FOREIGN PATENT DOCUMENTS 1059720  2/1967  United Kingdom ...................... 363/20

Primary Examiner—William M. Shoop
Attorney, Agent, or Firm—Oblon, Fisher, Spivak, McClelland & Maier

[57] ABSTRACT

A converter includes a resonant oscillatory tank circuit comprising a capacitor and an inductor, at least one switching circuit including a solid state switching device in series with a diode connected to apply a predetermined potential difference from a DV supply to the inductor, and synchronizing means responsive to the oscillation of the oscillatory circuit for switching on the switching means for a fraction of a cycle only when the instantaneous value of the oscillatory potential difference across the inductor is already not less than a predetermined value, to delay the fall of the said oscillating potential difference and inject energy from the supply into the oscillatory circuit, and a load circuit coupled or connected to the tank circuit.

14 Claims, 7 Drawing Figures

DC-AC CONVERTER INCLUDING SYNCHRONIZED SWITCHING

This invention relates to converters. The invention is particularly applicable, although not limited, to high-frequency converters incorporated in electric battery charging apparatus supplied from a mains supply. In the usual form of charger if a step down or step up of voltage is required a transformer is necessary and even where there is no change of voltage a transformer will generally be required to ensure isolation of the battery from direct connection to the mains supply. In the case of a high-power charger the weight and bulk of a transformer for mains frequency will be very substantial, but if the frequency involved is increased to some kiloherz, for example 25 KHz, the weight and bulk are greatly reduced. In the case of a battery-driven vehicle this may make it practicable to carry the charger on the vehicle.

An object of the present invention is to provide a converter having a more nearly sinusoidal output than has been hitherto available.

According to the present invention a converter includes a resonant oscillatory tank circuit comprising a capacitor and an inductor, a switching circuit including a solid state switching device connected to apply a predetermined potential difference from a DV supply to the inductor, and synchronising means responsive to the oscillation of the oscillatory circuit for switching on the switching means for a fraction of a cycle only when the instantaneous value of the oscillatory potential difference across the inductor is already not less than a predetermined value, to delay the fall of the said oscillating potential difference and inject energy from the supply into the oscillatory circuit, and a load circuit coupled or connected to the tank circuit.

The switching circuit may include a solid state switching device in series with a diode. Alternatively or in addition it may include a solid state switching device in parallel with a diode.

In one form of the invention, the tank circuit comprises an inductor connected in series with a capacitor across the DV supply and the switching circuit is connected in parallel with the capacitor.

In another form of the invention, of push pull form, the converter includes a pair of supply capacitors connected in series with each other across the DV supply, and a pair of solid state switching devices each in series with a diode, also connected in series with each other across the supply, and the inductor of the tank circuit is connected between the junction of the supply capacitors and the junction of the switching circuits.

The capacitor of the tank circuit may be connected between the junction of the switching circuits and one or each supply terminal, or it may be connected in parallel with the inductor.

The capacitor or the tank circuit may be shunted by a resistor, and may be connected in series with a solid state switching device for starting oscillation.

In one form of the invention the load circuit is connected or coupled to the tank circuit in parallel with the inductor.

Thus the load circuit may be connected to a secondary winding of a transformer having a primary winding in parallel with the inductor of the tank circuit. Alternatively, the load circuit may be connected to the secondary winding of a transformer of which the inductor of the tank circuit forms a primary winding.

The invention also embraces a battery charger incorporating the converter in combination with a rectifier to supply it from AC mains, a high-frequency transformer, and a rectifier for supplying unidirectional charging current.

Further features and details of the invention will be apparent from the following description of certain specific embodiments that will be given by way of example with reference to the accompanying drawings in which.

Figure 1:
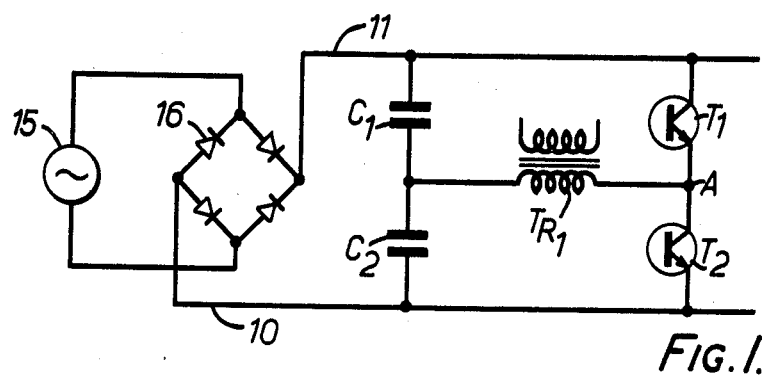
FIG. 1 is a diagram of a known arrangement.
Figure 2:
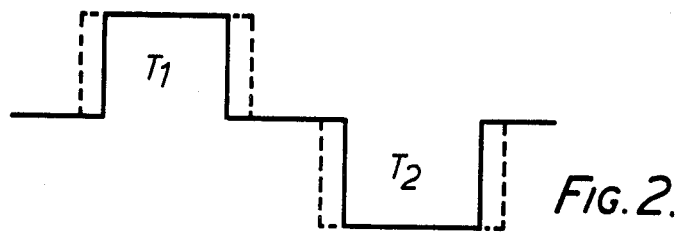
FIG. 2 is a wave form diagram of the known arrangement of FIG. 1.

FIG. 1 illustrates a typical known high-frequency converter operating from a DV (direct voltage, or direct current) source, shown as being derived from AC mains 15 through a rectifier 16 the purpose being to produce an isolated low voltage source of small dimensions. This technique is known generally as a chopped mode power supply. As shown in FIG. 1, a pair of capacitors $C_1$ and $C_2$ are connected in series across the positive and negative DV supply terminals 10 and 11, the reactance of these capacitors being negligible at the converting frequency (which might typically be 30 KHz). A pair of transistors $T_1$ and $T_2$ are also connected in series across the terminals of the DV supply, while the primary winding of a transformer $TR_1$ is connected between the junction of the capacitors and the junction A of the transistors. The transistors $T_1$ and $T_2$ are controlled by their base drives to switch on alternately. The output voltage of the transformer $TR_1$ will be controlled by the mark space ratio of the conduction time of each of the two transistors. FIG. 2 illustrates the voltage wave form appearing a the point A for two different output voltage conditions.

Due to the sharply changing voltage waveforms across the transistors the operating frequency and power output of such converters is severely limited by the permissible dissipation appearing across the switching devices on switch "on" and switch "off". Specifically on switch "off" the voltage appears across the device when the current flow through it is only slightly reduced, resulting in the high power condition of coincident high current and high voltage. A further undesirable feature of these converters, again due to the very high rates of change of voltage, is the radiated R.F. energy associated with the harmonics unavoidably present.

It is an object of this invention to produce a converter operating in a more nearly sinusoidal form, thus avoiding the drawbacks described above, and still achieve the necessary control of the output voltage.

Figure 3:
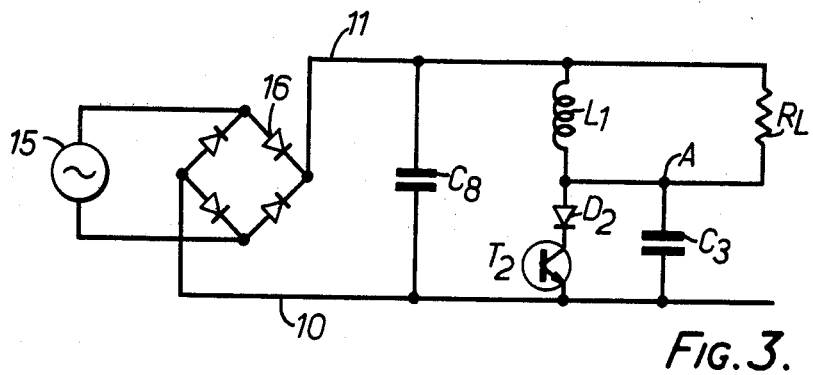
FIG. 3 is a schematic circuit diagram of one embodiment of the invention showing a single-ended parallel-load arrangement.

FIG. 3 shows an embodiment of the invention employing a single-ended form with parallel-connected load. The arrangement comprises a resonant oscillatory tank circuit consisting of an inductor $L_1$ connected in series with a capacitor $C_3$ across the supply terminals. As shown the supply terminals may be the terminals of a smoothing capacitor $C_8$ connected to the output of a bridge rectifier 16 whereof the input is connected to A.C. supply terminals 15. At the frequency of the tank circuit, (conveniently 25 KHz) the reactance of the smoothing capacitor is negligible so that although the capacitor $C_3$ and inductor $L_1$ are connected in series across the supply, they are effectively a parallel tuned circuit at their resonant frequency.

A load circuit $R_L$ is connected in parallel with the inductor whilst a transistor $T_2$ in series with a diode $D_2$ are connected in parallel with the capacitor $C_3$. The diode ensures that the transistor cannot be reverse biased even if the point A, namely the junction between the capacitor and inductor, goes negative.

The load $R_L$ may in fact be represented by the primary winding of a transformer connected in parallel with the inductor $L_1$ or it may be the reflected impedence across $L_1$ due to a loaded secondary winding magnetically coupled to $L_1$; in other words $L_1$ may be the primary winding of a transformer whose secondary winding is connected to a load, for example a rectifier connected to charge a secondary battery. The effect of this load is to damp the natural oscillation of the tank circuit by extracting energy from it.

Figure 4:
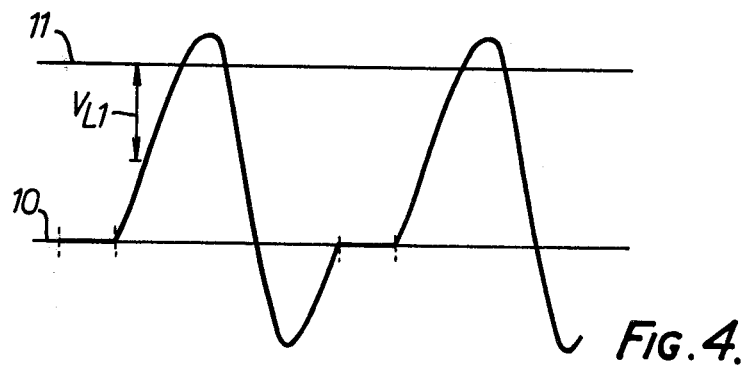
FIG. 4 is a wave form diagram of the arrangement of FIG. 3.

The operation is as follows, considering the capacitor $C_3$ discharged on initiating the supply. The transistor $T_2$ is switched "on" transferring energy from the supply to the inductor. Current rises in the inductor at a rate determined by the value of inductance and the supply voltage. After a preset interval the transistor $T_2$ is turned "off". The current flowing in the inductor is now transferred to the capacitor $C_3$ and the potential at the point A rises sinusoidally. FIG. 4 illustrates the waveform. Provided that $R_L$ does not load the tuned circuit heavily the point A describes the oscillatory path as shown. The excursions above and below zero are dependent on two factors, the damping effect of the load and the energy fed into the system in the period during which the transistor $T_2$ conducts. This period is variable and under the control of a feed back system, thus the amplitude of oscillation can be controlled to take account of load and supply variations. It should be noted that conduction of the transistor is only initiated when the voltage across it is zero or nearly so (this is determined by a sensing circuit which may take any of a number of well known forms for example as described below with reference to FIG. 7). Furthermore at termination of conduction the rate of rise of voltage is determined by the charging time of the capacitor $C_3$ associated with the current flowing in both the inductor $L_1$ and the load resistor $R_L$. The high dissipation condition mentioned above is avoided.

If $R_L$ were to be short circuited the oscillation would cease and due to the action of the sensing circuit mentioned above the transistor $T_2$ would not be turned on. On removal of the short circuit, oscillations may be re-initiated by a number of alternative methods.

Figure 5:
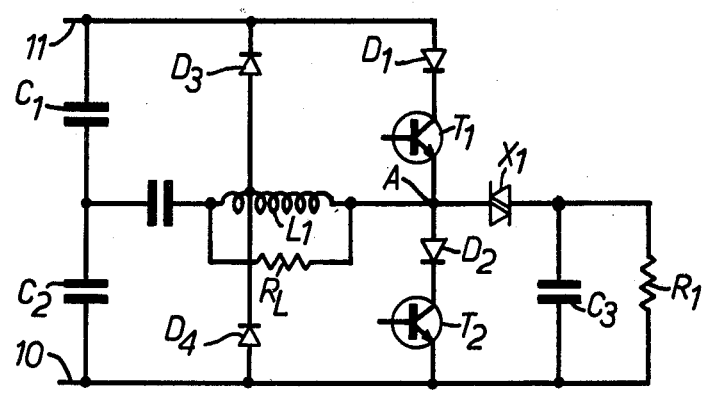
FIG. 5 is a schematic circuit diagram of a push-pull parallel-load arrangement.
Figure 6:
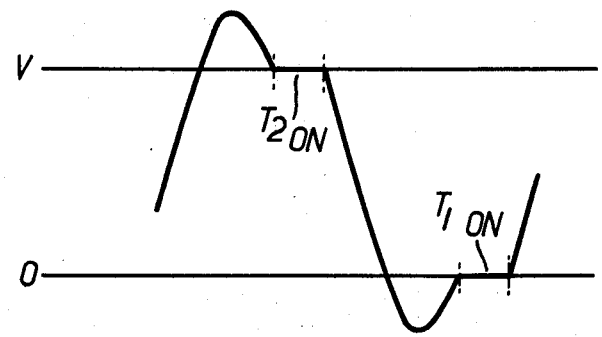
FIG. 6 is a wave form diagram of the arrangement of FIG. 5.

FIG. 5 shows a push-pull version of the above, FIG. 6 illustrating the waveform.

The circuit comprises a pair of supply capacitors $C_1$ and $C_2$ connected in series across the supply terminals 11 and 10, a pair of transistors $T_1$ and $T_2$ each in series with a diode $D_1$ or $D_2$, also connected in series across the supply terminals. An inductor $L_1$ in parallel (or effectively in parallel) with a load resistor $R_L$ is connected between the junction of the capacitors $C_1$ and $C_2$, and the junction between the transistor $T_1$ and diode $D_2$. To complete the tank circuit a capacitor $C_3$ shunted by a resistor $R_1$, is connected through a triac $X_1$ across the transistor $T_2$ and diode $D_2$. The push-pull circuit operates in a similar manner to that of FIGS. 3 and 4 but with of course two conducting periods per cycle, instead of one, as indicated in FIG. 6.

The triac $X_1$ is provided to initiate oscillations. The capacitor $C_3$ discharged by virtue of the resistor $R_1$, is charged when the triac is fired into conduction and oscillations commence. Due to the high frequencies involved, it would be unnecessary to refire the triac during normal operation.

Clamping diodes $D_3$ and $D_4$, shown on FIG. 5 are connected between each of the supply rails and a suitable tapping point on the inductor $L_1$. These diodes limit the voltage appearing across the inductor $L_1$, and therefore, the transistors $T_1$ and $T_2$, to a pre-determined safe value in the event of an open-circuit appearing on the output of the converter or, during the initiation of circuit oscillations.

The switching devices referred to above have been illustrated as transistors, but may be any suitable electronic switching devices such as thyristors of various types etc.

Figure 7:
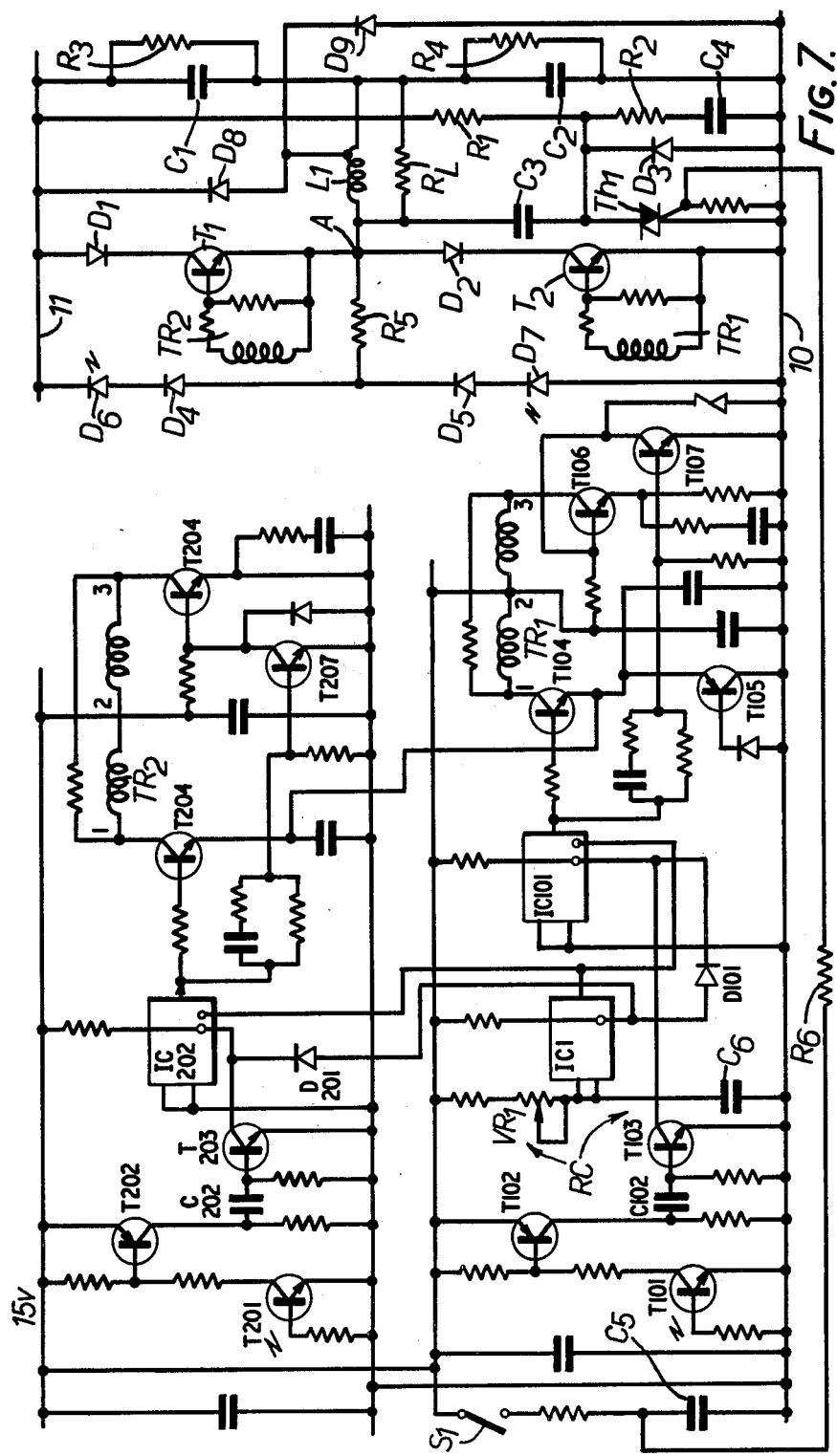
FIG. 7 is a more detailed circuit diagram of an arrangement similar to that of FIG. 5.

A starting circuit comprising a thyristor $TH_1$ connected in parallel to a reverse-connected diode $D_3$, as shown in FIG. 7, can be used to replace the triac $X_1$ of FIG. 5. The operation of this starting circuit is described later.

FIG. 7 shows an arrangement similar to that of FIG. 5 in greater detail. Thus the capacitors $C_1$ and $C_2$ will be seen on the right of the figure connected in series across the power supply terminals 11 and 10. Similarly, the transistors $T_1$ and $T_2$ each in series with a diode $D_1$ or $D_2$ will be seen connected in series with each other across the same pair of terminals, whilst the junction between the transistors and the junction between the capacitors are connected through the inductor $L_1$ which is shunted by a resistor $R_L$, which, as indicated above, may be a primary winding of a transformer or a winding inductively coupled to the inductor $L_1$.

The capacitors $C_1$ and $C_2$ share the supply voltage resistors $R_3$ and $R_4$ serving to compensate for unequal leakage currents, so that the potential at the junction of $C_1$ and $C_2$ with respect to the earthed terminal 10 is half the potential at the terminal 11. The inductor $L_1$ and a capacitor $C_3$ form a tuned tank circuit. Power is fed into the "tank" circuit by the alternate conduction of the transistors $T_1$ and $T_2$, the diodes $D_1$ and $D_2$ preventing reverse transistor current.

It is believed that the remainder of the circuit will be clear from the diagram, taken with the following description of its operation.

Starting is achieved by firing a Thyristor $Th_1$. As described below a logic system on the left of the diagram senses the potential at the point A; if this is negative with respect to the line 10 the drive circuit to the transistor $T_2$ is initiated, whereas if the point A is positive with respect to the line 11 the drive circuit to the transistor $T_1$ is initiated. Initially a switch $S_1$ is open, the thyristor $Th_1$ non-conducting, and the capacitor $C_3$ charges via a resistor $R_1$ and the inductor $L_1$ so that its bottom plate is positive with respect to the point A. A capacitor $C_4$ also charges via resistors $R_1$ and $R_2$. Closing the switch $S_1$ (which may be effected manually or electronically) fires the thyristor $Th_1$ which "grounds" the bottom plate of the capacitor $C_3$; the capacitor $C_4$ provides latching current for the thyristor $Th_1$. The point A is thus driven negative with respect to ground, initiating the drive to transistor T₂. Thereafter, the thyristor Th₁ remans in conduction, reverse currents being by-passed by a diode D₃.

Clamping diodes D₈ and D₉ are included as in FIG. 5 to limit the voltage appearing across the transistors T₁ and T₂ during initiation of circuit oscillations and in the event of an open-circuit appearing on the output of the converter.

Considering now the logic system, two identical circuits are employed providing the drive to each of the transistors T₁ and T₂ in turn. When the point A falls below the potential of the negative line 10, current flows via a resistor R₅ a diode D₅ and a light emitting diode D₇. When the point A rises above the potential of the positive line 11 current flows via the resistor R₅ a diode D₄ and a light emitting diode D₆. The L.E.D.'s form part of opto-isolators, the diode D₇ being associated with a transistor T101 and the diode D₆ with a transistor T201.

Conduction of the transistor T101 turns on a transistor T102 the output of which is differentiated by a capacitor C102 into the base of a transistor T103. The resultant negative going pulse at the collector passes through a diode D102 to trigger an integrated circuit IC1 cooperating with a resistor VR, and a capacitor C₆ to form a timer of which the timing period now commences. Simultaneously with the triggering of the timer, a further integrated circuit IC101 here connected as a flip-flop is triggered by the pulse from the collector of the transistor T103. The output of the integrated circuit IC1 "going high" removes the reset signal, triggering being therefore effected directly by the transistor T103. The output of the integrated circuit IC101 "going high" turns on a transistor T104 energising a primary winding of a transformer TR₁ which provides base drive to the transistor T₂. With the circuit IC101 high, a transistor T107 is held on, removing the base drive of a transistor T106.

At the end of the timing period of the timer IC1, its output "goes low" resetting the integrated circuit IC101 removing the base drive to the transistors T104 and T107. The transistor T106 thus "turns on", energising a second primary winding of the transformer TR₁ and applying reverse base drive to T₂ turning it off.

The circuit associated with the drive to the transistor T₁ performs in an identical manner being initiated by the opto-isolator consisting of the diode D₆ and transistor T201, (other corresponding components bearing numbers 200 odd instead of 100 odd). It should be noted that common timing components i.e. VR₁,R₇,C₆, and IC1 are used for both circuits.

It should further be noted that the timing periods commence when the potential of the point A becomes more positive than the positive line 11 or more negative than the negative line 10, but due to the diodes D₅ and D₆ power can only be transferred from the supply to the tank circuit when the said potential again has passed through that of the said line and the respective transistor and diode become forward biased. Thus the circuit is to a large degree self regulating under conditions of constant load and supply voltage. Any increase in the amplitude of oscillation will reduce the conduction period and hence energy transfer and vice versa.

The power output can be varied by adjustment of the variable resistor VR₁ to vary the resistance of the resistor capacitor timer IC1.

What we claim as our invention and desire to secure by Letters Patent is:

1. A DC-AC converter comprising:
    a direct current (D.C.) input supply having terminals providing a D.C. supply voltage;
    a load circuit including a transformer;
    an oscillatory circuit including at least one capacitor and an inductor connected to a primary winding of the load transformer;
    a switching circuit including at least one solid state switching device coupled to said oscillatory circuit in series circuit with said inductor across said D.C. terminal;
    means for synchronizing the operation of the switching circuit to the oscillation of the oscillatory circuit, said synchronizing means rendering said switching circuit non-conductive to allow the oscillatory circuit to oscillate freely for part of a cycle to transfer energy from the inductor to the capacitor to charge the latter to a certain condition in which the voltage across the inductor is substantial relative to that across the at least one switching device, which then has negligible voltage thereacross, and only then actuate said switching device to a conductive state to connect the inductor across the D.C. input terminals whereupon the inductor receives and stores energy from said supply.

2. A DC-AC converter of push-pull form comprising:
    a direct current (D.C.) input supply having terminals providing a D.C. supply voltage, said D.C. supply further having a center-tap;
    a load circuit including a transformer;
    an oscillatory circuit including at least one capacitor and an inductor connected to a primary winding of the load transformer;
    two solid-state switching devices connected in series across said D.C. terminals;
    said inductor connected in series between the supply center-tap and the junction between said switching devices; and,
    means for synchronizing the operation of the switching circuit to the oscillation of the oscillatory circuit, said synchronizing means rendering said switching circuit non-conductive to allow the oscillatory circuit to oscillate freely for part of a cycle to transfer energy from the inductor to the capacitor to charge the latter to a certain condition in which the voltage across the inductor is substantial relative to that across one of said switching devices, which then has negligible voltage thereacross, and only then actuate said one switching device to a conductive state to connect the inductor across half of the D.C. supply whereupon the inductor receives and stores energy from said supply.

3. A converter as claimed in claim 1 in which the switching circuit includes a solid state switching device in series with a diode.

4. A converter as claimed in claim 1 or claim 3 in which the oscillatory circuit comprises an inductor connected in series with a capacitor across the D.C. supply and the switching circuit is connected in parallel with the capacitor.

5. A converter as claimed in claim 2 in which the capacitor of the oscillatory is connected between the junction of the switching circuits and one or each supply terminal.

6. A converter as claimed in claim 2 in which the capacitor of the oscillatory circuit is connected in parallel with the inductor.

7. A converter as claimed in claim 2 in which the capacitor of the oscillatory circuit is shunted by a resistor.

8. A converter as claimed in claim 2 in which the capacitor of the oscillatory circuit is connected in series with a solid state switching device for starting oscillation.

9. A converter as claimed in claim 1 in which the load circuit is connected or coupled to the oscillatory circuit in parallel with the inductor.

10. A converter as claimed in claim 9 in which the load circuit is connected to a secondary winding of a transformer having a primary winding in parallel with the inductor of the oscillatory circuit.

11. A converter as claimed in claim 9 in which the load circuit is connected to the secondary winding of a transformer of which the inductor of the oscillatory circuit forms a primary winding.

12. A converter as claimed in claim 1 in which the frequency of the oscillatory circuit is at least 1 KHz.

13. A converter as claimed in claim 12 in which the frequency of the oscillatory circuit is of the order of 25 KHz.

14. A battery charger incorporating a converter as claimed in claim 1 or claim 2 or claim 9 in combination with a rectifier to supply it from A.C. mains, a high-frequency transformer and a rectifier for supplying unidirectional charging current.

* * * * *

UNITED STATES PATENT AND TRADEMARK OFFICE
CERTIFICATE OF CORRECTION

PATENT NO. : 4,196,469
DATED : April 1, 1980
INVENTOR(S) : DAVID GURWICZ

It is certified that error appears in the above-identified patent and that said Letters Patent are hereby corrected as shown below:

Please correct the Priority Data to read as follows:

[30]--Foreign Application Priority Data
    Jun.24, 1977 [GB] United Kingdom ....26680/77 and
    May 30, 1978 [GB] United Kingdom.....26680/77 --

Signed and Sealed this

First Day of July 1980

[SEAL]

Attest:

SIDNEY A. DIAMOND

Attesting Officer    Commissioner of Patents and Trademarks